United States Patent
Wegmann

Patent Number: 5,212,980
Date of Patent: May 25, 1993

[54] ARRANGEMENT FOR MEASURING DIMENSIONS OF A WORKPIECE

[75] Inventor: Heinz Wegmann, Mettmenstetten, Switzerland

[73] Assignee: Meseltron S.A., Corcelles, Switzerland

[21] Appl. No.: 787,144

[22] Filed: Nov. 4, 1991

[30] Foreign Application Priority Data

Nov. 5, 1990 [FR] France ............... 90 13763

[51] Int. Cl.⁵ .................................... G01B 13/10
[52] U.S. Cl. ....................................... 73/37.9
[58] Field of Search ....................... 73/37.9, 37.5

[56] References Cited

U.S. PATENT DOCUMENTS

| | | | |
|---|---|---|---|
| 2,497,236 | 2/1950 | Polk | 73/37.5 |
| 2,513,374 | 7/1950 | Stead et al. | 73/37.9 |
| 3,494,078 | 2/1970 | Miyamoto | 51/165 |
| 4,538,449 | 9/1985 | Wegmann et al. | 73/37.9 |

FOREIGN PATENT DOCUMENTS

| | | | |
|---|---|---|---|
| 2700439 | 7/1978 | Fed. Rep. of Germany | 73/37.9 |
| 793409 | 4/1958 | United Kingdom | 73/37.9 |
| 937054 | 9/1963 | United Kingdom | 73/37.9 |
| 1022145 | 3/1966 | United Kingdom | 73/37.9 |

Primary Examiner—Hezron E. Williams
Assistant Examiner—Joseph W. Roskos
Attorney, Agent, or Firm—Griffin, Butler, Whisenhunt & Kurtossy

[57] ABSTRACT

The arrangement of this invention for measuring the dimensions of a workpiece (14) includes a circuit in which a fluid circulates. Such circuit comprises a first branch (15) provided with an inlet nozzle (16) and at least one measuring nozzle (17) directed towards the workpiece the dimensions of which are to be measured, and a second branch (19) provided with an inlet nozzle (20) and opening into an output reference nozzle (21). A pressure transducer (22) furnishes an electrical signal representing the pressure difference in the two branches. The arrangement is original inasmuch as the fluid employed is a liquid and that the inlet nozzles are arranged to deliver a liquid flow at their output producing a minimum of noise on the electrical signal issuing from the pressure transducer. Utilization is for in-process measurement of cylindrical bores or outer diameters of cylindrical workpieces or indeed of planar surfaces.

12 Claims, 3 Drawing Sheets

ARRANGEMENT FOR MEASURING DIMENSIONS OF A WORKPIECE

This invention concerns an arrangement for measuring dimensions of a workpiece and comprises a circuit in which a liquid circulates, such circuit including a first branch provided with an inlet nozzle and at least one measuring nozzle directed towards the workpiece the dimensions of which are to be measured, and a second branch provided with an inlet nozzle and opening into an output reference nozzle, a pressure transducer furnishing an electrical signal representing the difference of the pressures prevailing in the two branches of the circuit, and means for connecting the inlet nozzles to a source of regulated pressure.

BACKGROUND OF THE INVENTION

Such a measuring arrangement is known and is described for instance in the standard DIN 2271 where air under pressure is employed in place of the liquid used in the present arrangement. A similar arrangement is described in the patent document EP-B-0 109 936 (=U.S. Pat. No. 4,538,449).

As is seen in FIG. 1, the arrangement of the cited document consists in feeding via a pressure regulator 1 a pneumatic circuit comprising a first branch 15 provided with an inlet nozzle 16 and a measuring plunger 4 adapted for instance to be introduced into a bore 5 the diameter of which is to be measured, as well as a second branch 19 provided with an inlet nozzle 20 opening into a reference nozzle 21, the flow through which may be regulated. A pressure transducer 22 connected between branches 15 and 19 furnishes an electrical signal representing the difference of the pressures prevailing in such branches, which signal is amplified by an amplifying arrangement 10 prior to being led to an indicating arrangement 11 for instance. It is thus clear that if the plunger 4 is introduced into a larger bore, for instance, the pressure prevailing in branch 15 will be reduced and the variation of the pressure differential detected by the transducer 22 will be representative of the increase in diameter of bore 5. The essential interest of the differential assembly is to absorb automatically noise variations of pressure due, for instance, to the functioning of the pressure regulator 1 or to temperature effects.

The object of the invention described in patent document EP 0 109 936 is that of proposing an improvement in the known arrangements which permits considerable reduction in the measurement noise as well as the time constant of the measuring arrangement and sensitivity to vibration, while enabling an adjustment which is simple and independent of the sensitivity of the arrangement and of the null point of the output signal.

To this end, the cited invention provides the use of a differential pressure transducer using semi-conductor elements and arranging the assembly of the transducer and the pneumatic circuit within the measuring plunger. While leaving one at liberty to define the pneumatic circuit in an optimum manner so as to limit as far as possible the production of measurement noise, such solution enables the obtaining of a measuring arrangement entirely insensitive to vibrations and the time constant of which, on the order of a tenth of a second, is sufficiently small to enable obtaining extremely rapid measurements, for instance between two penetrations of an oscillating machine tool into a workpiece or measuring discontinuous surfaces of a workpiece in motion.

In spite of the improvements which it brings, the system of the cited invention gives rise to several difficulties, all coupled to the fact that the fluid employed is air under pressure:

The cutting liquid employed for cooling and lubricating the workpiece to be machined is often found to be a mixture based on petrol. If air under pressure is employed for the measurement of the dimensions of the workpiece at the same time as this is being machined, the cooling petrol may be pulverized by the air and thus bring about explosions should the cutting tool produce sparks. Generally as well, the cutting liquid thus pulverized may be harmful for the health or at least provoke general discomfort and dirtying of objects located in the surroundings of the machine.

It has been indicated that the time constant of the measuring arrangement is on the order of a tenth of a second (100 ms). This reaction time is connected to the fact that the fluid employed is air, basically compressible. In certain cases, the attained time of 100 ms slows the machining process, for instance in the machining of the truing of interior bores where the coming and going of the grinder could be much more frequent within a predetermined time lapse if the dwell time of the measuring arrangement within the piece could be shortened. Because of the elasticity of the air employed for the measurement, the pressure requires a certain time to be established and to be stabilized at the places of measurement which thus prevents rapid machining since it is necessary to proceed with a measurement which lasts a relatively long time following each passage of the tool.

It will be further noted that in the cited document the time constant of 100 ms has been capable of attainment thanks to the fact that the measurement arrangement and the measuring plunger form only a single part, thus diminishing the length of the paths travelled by the air. This advantage leads however to the providing of a heavier and larger apparatus which is poorly suited to the measurement of small workpieces.

The cited difficulties have already been anticipated by the applicant of this invention who has proposed, in an arrangement called Hydrocompar, the replacement of the air in the known systems by a liquid to overcome said difficulties.

By employing a liquid in the place of air, it has been possible to reduce considerably the time constant of the system and times on the order of 10 ms have been observed, which improves by 10 times the system response relative to systems formed according to the document cited hereinabove. This is due principally to the almost total incompressibility of the liquid. The liquid employed, as well as no longer being followed by pulverization effects, no longer requires construction of a clumsy and sometimes inconvenient compact system.

The Hydrocompar arrangement cited hereinabove uses input nozzles identical to those employed with arrangements employing air, and this has the disadvantage of creating undesirable turbulence in the liquid. Such turbulences bring about substantial background noise onto the pressure transducer.

SUMMARY OF THE INVENTION

To avoid the cited difficulties, the measuring arrangement according to this invention is characterized by the fact that the inlet nozzles are equipped with means for furnishing at their output a liquid flow producing minimum noise on the electrical signal issuing from the pressure transducer.

The invention will be understood now with reading of the following description illustrated by the drawings giving practical examples.

DESCRIPTION OF THE PREFERRED EMBODIMENTS

Figure 1:
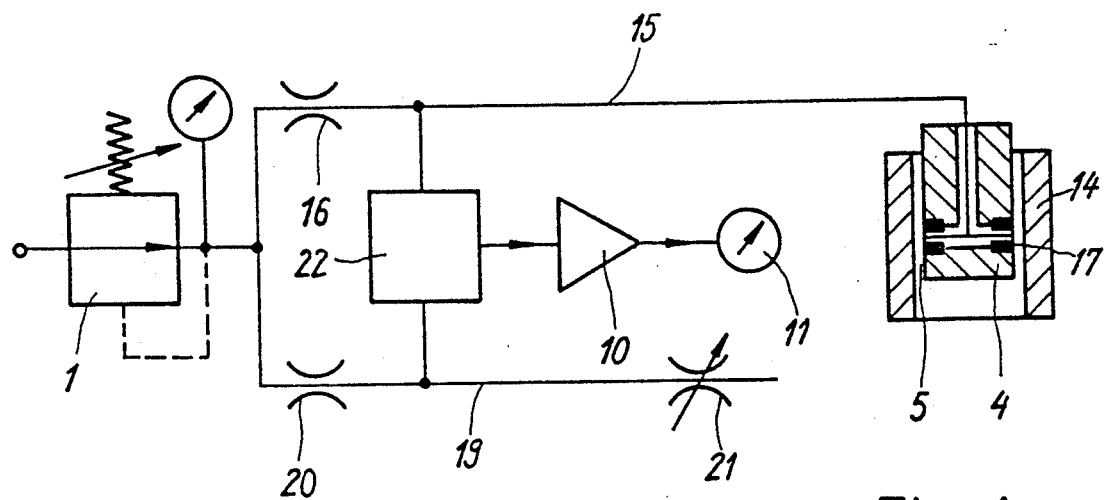
FIG. 1 is a schematic view of a pneumatic pressure measuring arrangement according to the prior art.
Figure 2:
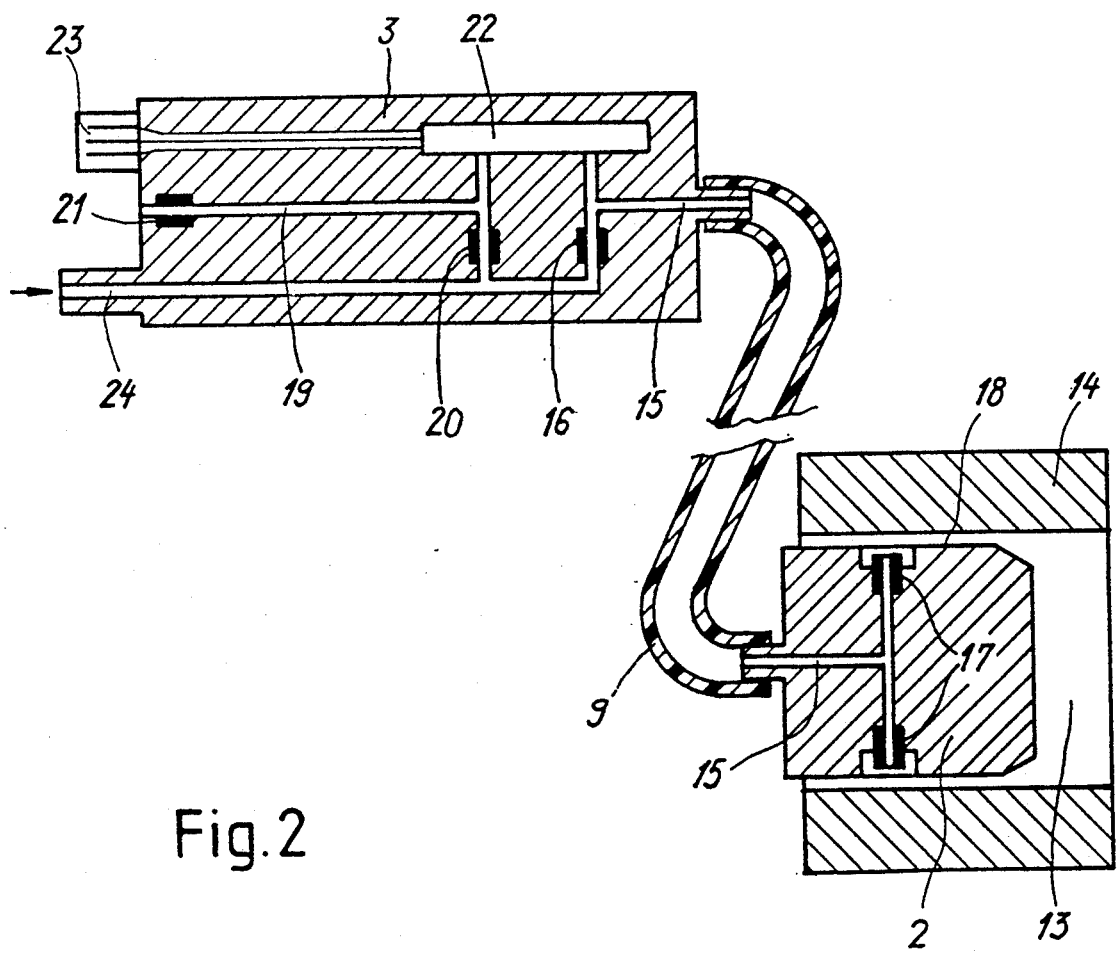
FIG. 2 shows a measuring arrangement according to a first embodiment of the invention adapted to measuring bores.
Figure 3:
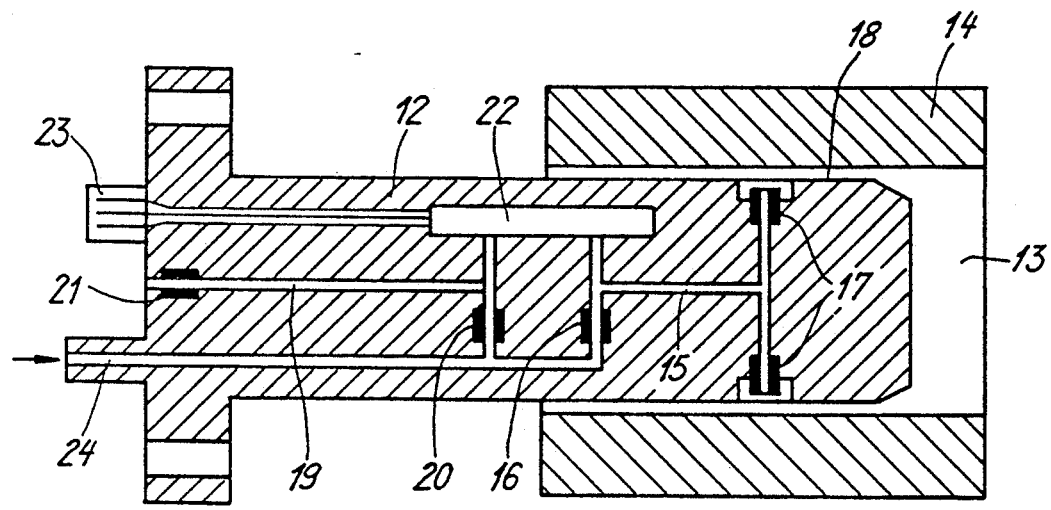
FIG. 3 shows a pressure measuring device according to a second embodiment of the invention, likewise adapted to the measurements of bores.

In a very general manner, FIGS. 2 and 3 show two different embodiments of the invention in which the measuring arrangement includes a circuit in which a liquid circulates. Such circuit comprises a first branch 15 provided with an inlet nozzle 16 and at least one measuring nozzle 17 directed towards the workpiece 14, the interior dimensions 13 of which are to be measured. The circuit further comprises a second branch 19 provided with an inlet nozzle 20 and opening into an output reference nozzle 21. The arrangement further comprises a pressure transducer 22 furnishing an electrical signal on its terminals 23, such signals being representative of the difference in pressures prevailing in branches 15 and 19 of the circuit. FIGS. 2 and 3 further show that a nipple 24 enables coupling the inlet nozzles 16 and 20 to a regulated pressure source (not shown).

More specifically, FIGS. 2 and 3 show arrangements furnished with a measuring plunger 2, respectively 12 on the surface of which open out the measuring nozzle 17.

In the case of the arrangement of FIG. 2, the system includes a measuring unit 3 including the inlet nozzles 16 and 20, the output reference nozzle 21 and the pressure transducer 22. A flexible conduit 9 connects plunger 2 to the unit 3. In this case one may employ plungers of any dimensions whatsoever, indeed of very small dimensions with a standard measuring unit. It has already been mentioned that the measuring fluid being liquid, the reaction time of the system is extremely short, on the order of 10 ms, and this within reasonable limits of length of the conduit 9.

In the case of the arrangement of FIG. 3, the measuring nozzles 17, inlet nozzles 16 and 20, the output reference nozzle 21 and the pressure transducer 22 are entirely housed within the interior of plunger 12.

In the special cases of FIGS. 2 and 3, the measuring plungers 2 and 12 include a cylindrical end 18 for measuring the diameter of a bore 13. Two measuring nozzles 17 open out symmetrically at two opposite places of the cylindrical end 18.

The differential pressure transducer 22 is a semiconductor element. It is formed essentially by a semiconducting plate in which has been formed a membrane by chemical machining procedures as well as a bridge of piezo resistors formed on the membrane and amplifying elements. Such pressure transducers and their manufacture are described for instance in the French patent application 2 266 314. One may obtain them from the Semsym company under reference SPX 200.

It appears of interest to dimension the reference nozzle 21 in a manner such that the differential pressure between the two branches be null at the instant when the dimensions of the workpiece 14 attain their intended value. Effectively, the stability and precision of measurement of the dimensions are maximum when such differential pressure is close to zero and the preceding arrangement enables assuring that the maximum precision is obtained, for instance during machining when one approaches the desired dimensions.

Figure 7:
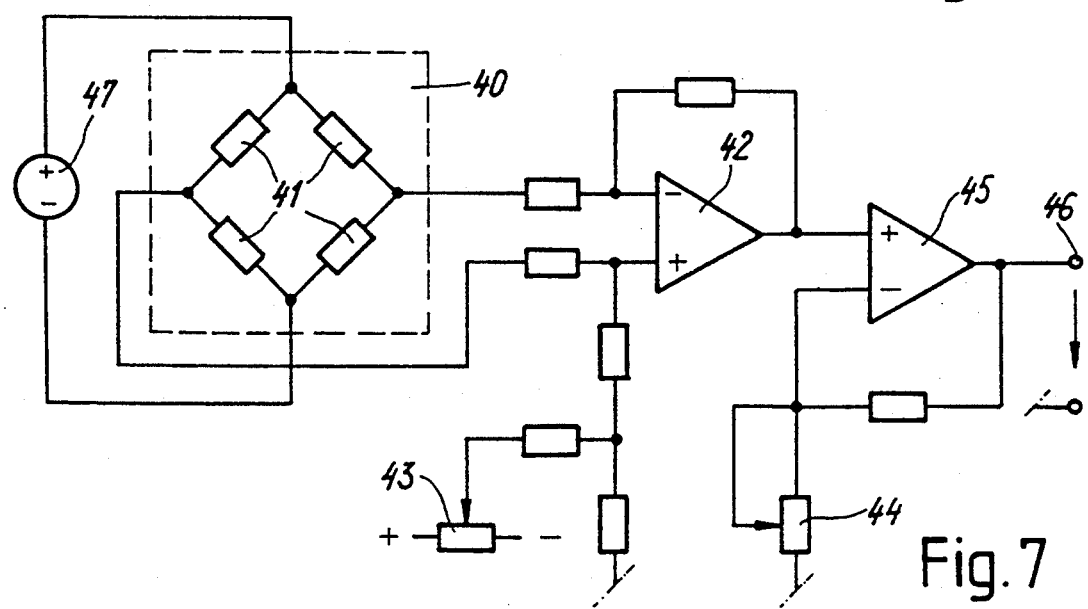
FIG. 7 is a schematic drawing of a control and energization circuit for a transducer employed in the measuring arrangement according to the invention.

In FIG. 7, there has been shown in a schematic manner a control circuit for the differential pressure transducer employed in the arrangement of the invention. Such transducer is schematically shown in the framework in dotted outline 40 by a bridge of piezo resistors 41 which are energized by a source 47, preferably a current source. An operational amplifier 42, one of the inputs of which is controlled through a variable potentiometer 43, enables assuring the zero setting of the output signal while the amplification gain is defined by the potentiometer 44 which acts on amplifier 45 at the output 46 of which may be collected the signal representing the measured dimension.

It is to be mentioned that whatever be the manner of obtaining the measuring arrangement according to FIG. 2 or FIG. 3, the dimensional and dynamic characteristics of such arrangement enable applying it to numerous types of measurements within the domain of machining of workpieces. In particular, it is especially well adapted to be mounted within the workpiece spindle head of an interior truing machine and kinematically coupled to the tool spindle head piece so as to bring about a measurement of the bore diameter of a trued piece during each oscillation of the tool, and to thus permit regulating continuously the advance of the grinder throughout the truing operation and to stop it when the nominal diameter of the bore has been attained.

Figure 4:
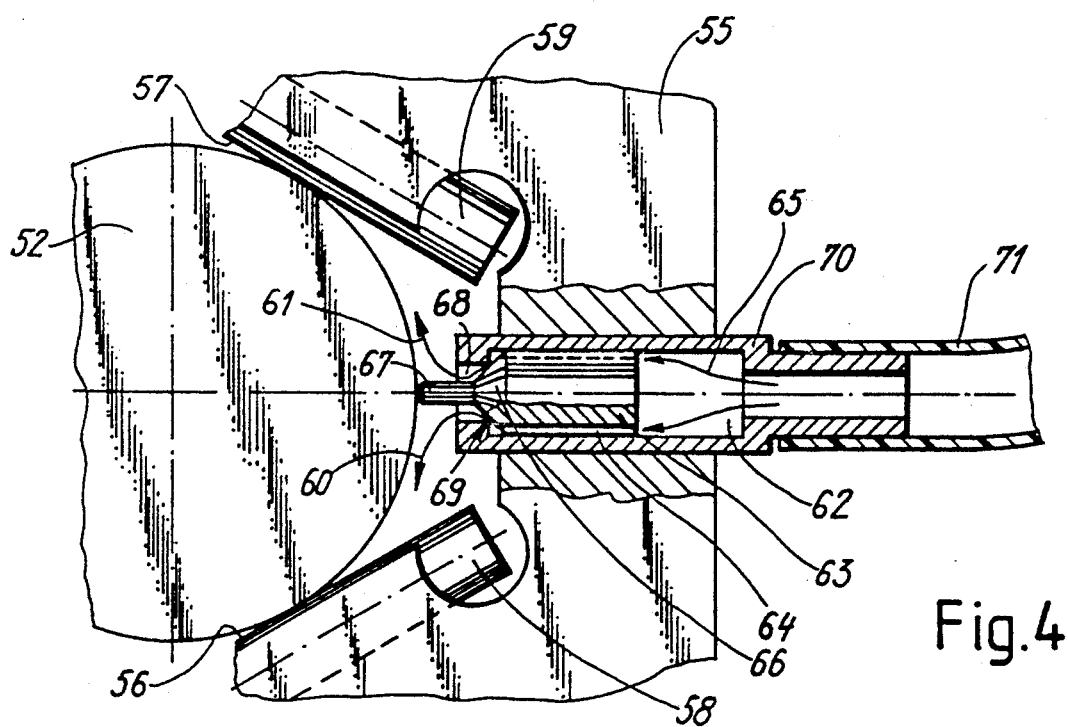
FIG. 4 shows a measuring sensor employed in the arrangement according to the invention, such sensor being adapted to the measurement of diameters of cylindrical workpieces.

FIG. 4 shows a measuring sensor 70 employed on the arrangement according to the invention, such sensor being adapted to measure the diameter of cylindrical workpieces. Here the arrangement includes a head 55 having an opening provided with two rectilinear ridges 56 and 57 arranged in V. The ridges bear against the workpiece 52 and are here materialized by cylindrical bar generators or jaws 58 and 59 formed of hard material as for instance tungsten carbide. On head 55 is mounted a sensor 70 arranged along the bisector of the angle formed by ridges 56 and 57, such sensor furnishing, in a well known manner, a signal representing the diameter of the part to be machined. The sensor 70, taking the place of the measuring nozzle, is here a sensor of the indirect leakage type. A liquid 65 under pressure is injected into the flexible tube 71 which is shrunk onto the sensor 70. The sensor includes a chamber 62 in which moves a piston 63. Such piston is provided with channels 64 to allow passage of the liquid. The piston terminates in a cone 66 and a feeler 67. When the sensor is free, the piston blocks orifice 68 by urging cone 63 against a flange 69 present on such orifice 68. When the piston 67 is pushed back towards the right, which happens when the diameter of the part 52 diminishes under the effect of the operation of the grinder, liquid may flow according to arrow 60 and 61. At this instant the liquid flow varies, which has as consequence to bring about variation of the pressure which then constitutes a measure of the penetration of the feeler into the sensor.

It is clear that the head which has just been described may be coupled by means of a flexible tube 71 to the measurement unit 3 which has been described with reference to FIG. 2, the differential measuring system remaining the same.

There will now be described two forms of inlet nozzles which call for substantial commentary.

Figure 5:
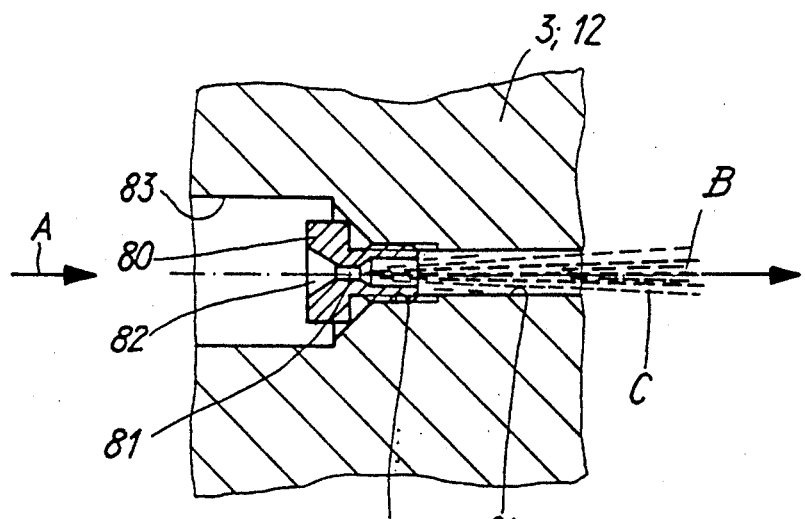
FIG. 5 shows an inlet nozzle such as is known for pneumatic measuring, but here applied to a liquid.

Nozzle 80 of FIG. 5 is of a form currently employed in order to be assembled onto pneumatic arrangements. Nozzle 80 is screwed into a threading 73 provided either in the measurement unit 3 (FIG. 2) or in the plunger 12 (FIG. 3). Such a nozzle is employed as inlet nozzle 16 and 20 and generally includes an inlet cone 82 and a constriction 81. If a liquid is injected in channel 83 in the sense of arrow A, constriction 81 will have as effect to increase the velocity of the liquid at the output 84 of the nozzle in direction B and, consequently, bring about unwanted turbulence, this provoking substantial background noise on the pressure transducer. The turbulences are produced by a jet at B with high speed relative to the region C where such speed is less substantial.

Figure 6:
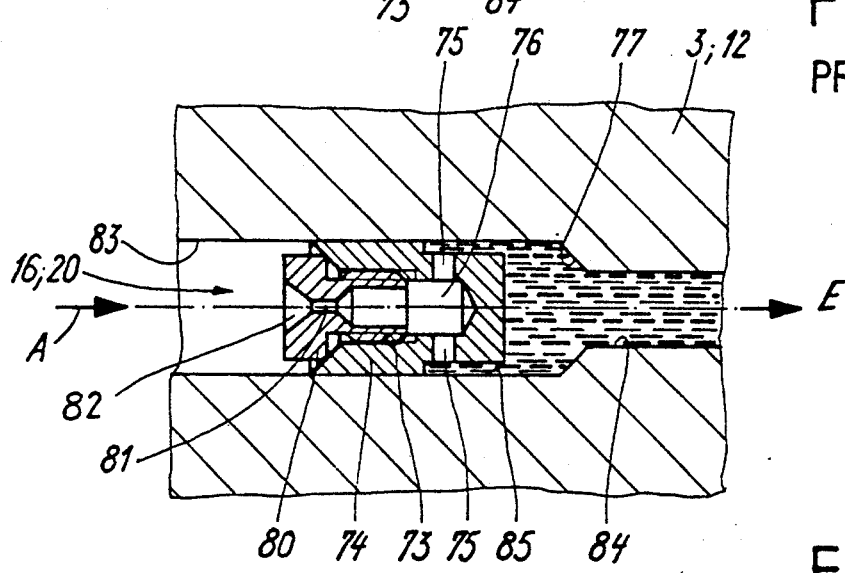
FIG. 6 shows an inlet nozzle modified according to the invention.

The nozzle of FIG. 6 has been conceived to avoid such turbulences and to assure at its output an homogeneous liquid flow. Such nozzle includes two parts. The first part 80 resembles that of FIG. 5 with its inlet cone 82 and its constriction 81. Such first part is screwed into a threading 73 provided in a second part 74 itself driven into the inlet channel 83. Such second part 74 includes a chamber 76 and at least one outlet duct 75 arranged substantially perpendicular to the axis of the constriction 81. The arrangement is that the cross-section of duct 75 be greater than the cross-section of the constriction 81. Such difference of cross-section combined with the perpendicularity mentioned have as result the dissipation of the kinetic energy of the liquid jet, or if preferred, the breaking down of the velocity without production of the additional fall in pressure. One then finds in the output channels 85 and 84 a liquid flowing without much turbulence in the direction of arrow E and attaining the pressure transducer 22 without provoking noise.

The invention is not limited to the nozzle described in FIG. 6. Any other form could be imagined which would enable furnishing at the nozzle output a liquid flow producing minimum noise on the electrical signal issuing from the pressure transducer.

There have been seen the advantages brought about by the joint employment of a liquid and the special nozzle in the measuring arrangements for dimensions of workpieces, the main advantages residing in the fact that such reduces the time necessary for measurement in the arrangements of in-process measuring and, from there, enables a higher production cadence. It will be noted that one may employ with profit a measuring liquid which is the same as the liquid used for machining the workpieces, naturally under the condition that an appropriate filtering of the quality is carried out.

What I claim is:

1. An arrangement for measuring dimensions of a workpiece comprising a circuit in which a liquid circulates, said circuit including a first branch provided with an inlet nozzle and at least one measuring nozzle directed towards the workpiece the dimensions of which are to be measured, and a second branch provided with an inlet nozzle and opening into an output reference nozzle, a pressure transducer furnishing an electrical signal representing the difference in the pressures prevailing in the two branches of the circuit and means for connecting the two inlet nozzles to a source of regulated pressure, the inlet nozzles being provided with means for furnishing a liquid flow at their output producing minimum noise on the electrical signal issuing from the pressure transducer.

2. An arrangement as set forth in claim 1 further including a measuring plunger at the surface of which the measuring nozzle(s) open(s) out, a measuring unit including the inlet nozzles, the ouput reference nozzle and the pressure transducer and a flexible conduit coupling said plunger to said unit.

3. An arrangement as set forth in claim 2 wherein the measuring plunger includes a cylindrical end for measuring the diameter of a bore and two symmetric measuring nozzles opening out at two oppositely situated places on the cylindrical end.

4. An arrangement as set forth in claim 1 further comprising a measuring plunger at the surface of which the measuring nozzle(s) open(s) out, the inlet nozzles, the output reference nozzle and the pressure transducer being entirely housed within said plunger.

5. An arrangement as set forth in claim 4 wherein the measuring plunger includes a cylindrical end for measuring the diameter of a bore and two symmetric measuring nozzles opening out at two oppositely situated places on the cylindrical end.

6. An arrangement as set forth in claim 1 including a measuring head having an opening provided with two ridges arranged in a V form and adapted to bear on a cylindrical workpiece the diameter of which is to be measured, the head bearing a nozzle or measuring sensor being arranged along the bisector of the angle formed by the two ridges, said nozzle or sensor being coupled by a flexible conduit to a measuring unit including the inlet nozzles, the output reference nozzle and the pressure transducer.

7. An arrangement for measuring dimensions of a workpiece comprising a circuit in which a liquid circulates, said circuit including a first branch provided with an inlet nozzle and at least one measuring nozzle directed towards the workpiece the dimensions of which are to be measured, and a second branch provided with an inlet nozzle and opening into an output reference nozzle, a pressure transducer furnishing an electrical signal representing the difference in the pressures prevailing in the two branches of the circuit and means for connecting the two inlet nozzles to a source of regulated pressure, the inlet nozzles being provided with means for furnishing a liquid flow at their output producing minimum noise on the electrical signal issuing from the pressure transducer, said inlet nozzles each including a constriction and at least one output duct separated by a chamber, the cross-section of the output duct being greater than the cross-section of the constriction and the output duct being arranged to be substantially perpendicular to the axis shown by the constriction.

8. An arrangement for measuring dimensions of a workpiece, said arrangement comprising:
a source of pressure regulated liquid;
at least one measuring nozzle directed towards the workpiece the dimensions of which are to be measured;
an output reference nozzle;
circuit means for conveying liquid in a downstream direction from said source to said output reference nozzle and said at least one measuring nozzle;
said circuit means having a first branch including a first inlet nozzle and said at least one measuring nozzle and a second branch including a second inlet nozzle and said output reference nozzle;
a pressure transducer having a first input connected to said first branch between said first inlet nozzle and said at least one measuring nozzle and a second input connected to said second branch between said second inlet nozzle and said output reference nozzle, said pressure transducer producing an electrical signal representing the difference in pressures in said first and second pressures;
first liquid turbulence reducing means located downstream of said first inlet nozzle and upstream of where said first transducer input connects with said first branch; and,
second liquid turbulence reducing means located downstream of said second inlet nozzle and upstream of where said second transducer input connects with said second branches, said first and second liquid turbulence reducing means reducing turbulence created by passage of liquid through said first and second inlet nozzles, respectively.

9. An arrangement as set forth in claim 8 further including a measuring plunger at the surface of which the measuring nozzle(s) open(s) out, and a measuring unit including the inlet nozzles, the output reference nozzle and the pressure transducer, said first branch including a flexible conduit coupling said plunger to said unit.

10. An arrangement as set forth in claim 9 wherein the measuring plunger includes a cylindrical end for measuring the diameter of a bore and two symmetric measuring nozzles opening out at two oppositely situated places on the cylindrical end.

11. An arrangement as set forth in claim 8 further comprising a measuring plunger at the surface of which the measuring nozzle(s) open(s) out, the inlet nozzles, the output reference nozzle and the pressure transducer being entirely housed within said plunger.

12. An arrangement as set forth in claim 8 including a measuring head having an opening provided with two ridges arranged in a V form and adapted to bear on a cylindrical workpiece the diameter of which is to be measured, the head bearing a nozzle or measuring sensor being arranged along the bisector of the angle formed by the two ridges, said nozzle or sensor being coupled by a flexible conduit to a measuring unit including the inlet nozzles, the output reference nozzle and the pressure transducer.

* * * * *